US008375402B2

(12) United States Patent
Majewski et al.

(10) Patent No.: US 8,375,402 B2
(45) Date of Patent: *Feb. 12, 2013

(54) MECHANISM FOR INTERFACING A DISPLAY SCREEN OF ANOTHER TECHNOLOGY WITH A COMPUTING PLATFORM

(75) Inventors: Joseph Steven Majewski, Strongsville, OH (US); Gerald Walter, Canton, OH (US); Don L. Brett, Poland, OH (US); Joe Stough, Cleveland, OH (US)

(73) Assignee: Honeywell International Inc., Morristown, NJ (US)

(*) Notice: Subject to any disclaimer, the term of this patent is extended or adjusted under 35 U.S.C. 154(b) by 901 days.

This patent is subject to a terminal disclaimer.

(21) Appl. No.: 12/411,165

(22) Filed: Mar. 25, 2009

(65) Prior Publication Data

US 2010/0251266 A1 Sep. 30, 2010

(51) Int. Cl.
G06F 13/00 (2006.01)
G06F 3/048 (2006.01)
(52) U.S. Cl. ............... 719/323; 715/764; 715/765
(58) Field of Classification Search .......... 719/321, 719/323; 715/764, 765
See application file for complete search history.

(56) References Cited

U.S. PATENT DOCUMENTS

| 5,297,252 | A  | * | 3/1994  | Becker          | 715/803 |
| 6,300,947 | B1 | * | 10/2001 | Kanevsky        | 715/866 |
| 6,580,950 | B1 | * | 6/2003  | Johnson et al.  | 700/17  |
| 7,047,092 | B2 | * | 5/2006  | Wimsatt         | 700/83  |
| 7,154,483 | B2 |   | 12/2006 | Kobayashi       |         |
| 7,206,647 | B2 |   | 4/2007  | Kumar           |         |
| 7,408,538 | B2 |   | 8/2008  | Hinckley et al. |         |
| 7,549,154 | B2 | * | 6/2009  | Rhoten et al.   | 719/321 |
| 7,577,912 | B2 | * | 8/2009  | Govindan et al. | 715/746 |
| 7,926,072 | B2 | * | 4/2011  | Teng et al.     | 719/328 |
| 2002/0152298 | A1 | * | 10/2002 | Kikta et al.  | 709/223 |
| 2003/0067489 | A1 | * | 4/2003  | Candy Wong et al. | 345/765 |
| 2003/0146934 | A1 | * | 8/2003  | Bailey et al. | 345/765 |
| 2004/0027378 | A1 | * | 2/2004  | Hays et al.   | 345/763 |
| 2004/0163046 | A1 | * | 8/2004  | Chu et al.    | 715/517 |
| 2005/0181874 | A1 | * | 8/2005  | Bond          | 463/36  |

OTHER PUBLICATIONS

Samad et al. "Leveraging the Web: A Universal Framework for Building Automation", Proceedings of the 2007 American Conference, New York City, Jul. 11-13, 2007. pp. 1-6.*
http://support.elgato.com/index.php?, "Elgato Systems Technical Support. How Do I Use the On Screen Menu?", 3 pages, printed Dec. 16, 2008.
http://www.microsoft.com/windowsmobile, "Using Tasks Application, Smartphone and PDA, Total Access," 1 page, printed Dec. 16, 2008.
Cardio Manual, Secant Home Automation Inc., 55 pages, prior to Mar. 25, 2009.
Example of Sort Feature of Microsoft Internet Explorer, 1 page, Created Dec. 16, 2008.
Example of Sort Feature of Microsoft Excel 1 page, Created Dec. 16, 2008.

* cited by examiner

*Primary Examiner* — Emerson Puente
*Assistant Examiner* — Willy W Huaracha
(74) *Attorney, Agent, or Firm* — Seager Tufte Wickhem LLC

(57) ABSTRACT

A system for constructing embedded display content and navigation where a computing platform is based on one technology and the embedded display content is based on another technology. For instance, the one technology may be NiagaraAX and the other technology may be non-Niagara. The system may, for instance, leverage NiagaraAX Workbench tooling to generate displays rendered in heterogeneous technologies, i.e., non-Niagara, to extend the range and application of user interfaces for Niagara-based technologies.

20 Claims, 17 Drawing Sheets

MECHANISM FOR INTERFACING A DISPLAY SCREEN OF ANOTHER TECHNOLOGY WITH A COMPUTING PLATFORM

Related patent applications include U.S. patent application Ser. No. 12/411,183, filed Mar. 25, 2009, entitled, "A SMALL SCREEN DISPLAY WITH A DATA FILTERING AND SORTING USER INTERFACE"; U.S. patent application Ser. No. 12/411,193, filed Mar. 25, 2009, entitled "A SYSTEM FOR DEFINING A USER INTERFACE OF A REMOTE DISPLAY DEVICE"; U.S. patent application Ser. No. 12/411,201, filed Mar. 25, 2009, entitled "An APPROACH FOR ADVANCED USER NAVIGATION"; U.S. patent application Ser. No. 12/411,134, filed Mar. 25, 2009, entitled "AN AUTOMATIC CONFIGURATOR OF DISPLAY OBJECTS"; U.S. patent application Ser. No. 12/411,080, filed Mar. 25, 2009, entitled "AN EMBEDDED COMPUTING SYSTEM USER INTERFACE EMULATED ON A SEPARATE COMPUTING DEVICE"; all of which are hereby incorporated by reference.

BACKGROUND

The invention pertains to computing platforms and their respective user interfaces.

SUMMARY

The invention is a mechanism for interfacing a computing platform of one technology with a display interface of another technology.

BRIEF DESCRIPTION OF THE DRAWING

FIGS. 6 through 14 are a series of screen shots illustrating display definition as outlined in FIG. 5a.

DESCRIPTION

Figure 1A:
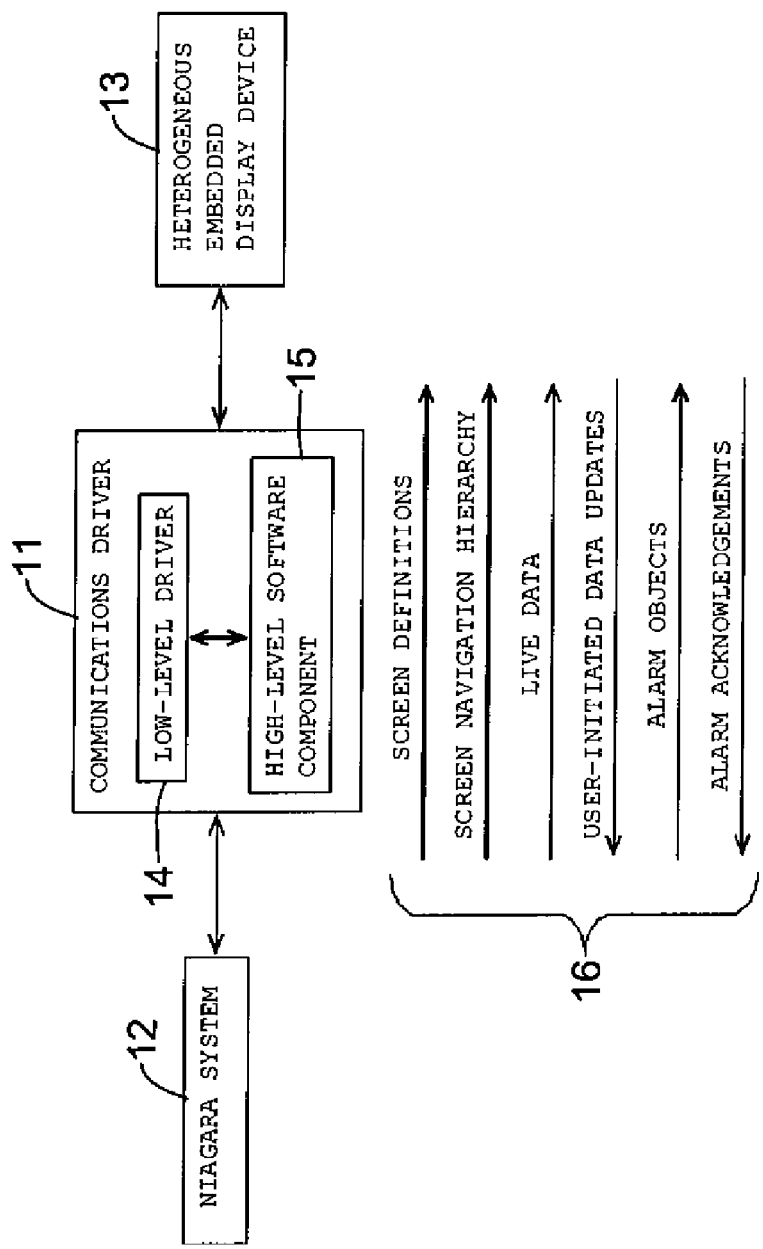
FIG. 1a is a diagram of a layout of a Niagara system, a heterogeneous display device and an interconnecting communications driver.

A NiagaraAX framework provides software tools and a methodology for constructing user interfaces for NiagaraAX based solutions. NiagaraAX items are products of Tridium, Inc., which is a global software and services company headquartered in Richmond, Va.

The NiagaraAX framework only supplies tooling and methodology for native NiagaraAX embedded touch screens using Niagara PX pages and for web-based embedded displays using Niagara HX pages. It does not however necessarily provide a means for constructing user interfaces for embedded displays that are not implemented using these specific technologies.

The terms "NiagaraAX" and "Niagara" may be used interchangeably in the present application. If "Niagara" is to mean something else besides "NiagaraAX", it will be indicated as such herein.

The invention is an approach and apparatus for definition of an embedded screen user with Niagara wiresheets. The invention is further for constructing embedded display content and navigation for NiagaraAX-based solutions when the display rendering technology is not a Niagara thick client (PX) or a Niagara thin client (HX). The invention may be regarded as novel because it leverages the existing NiagaraAX Workbench tooling to generate displays rendered in heterogeneous technologies thus extending the range and richness of user interface experience for Niagara-based systems. Users and integrators familiar with NiagaraAX Workbench tools and workflow may easily create rich user interfaces for their NiagaraAX-based systems that can then be rendered and used by a variety of display platforms independent of vendor technology. The invention may have use for, application to and/or implementation in a building control system or building automation system (BAS).

The invention may be related and tied into Tridium's NiagaraAX framework and Workbench tool.

An apparatus and approach for definition of embedded user interfaces with NiagaraAX wiresheets may be noted. The general architecture of the system that the invention serves may be defined. The system consists of a NiagaraAX Java Application Control Engine (JACE) and an embedded display unit. The JACE includes the NiagaraAX software framework, associated NiagaraAX software modules and a system definition including but not limited to field bus driver instances and control logic. The embedded display device consists of an embedded computing platform supporting at minimum, but not limited to, an LCD or equivalent pixel-based display, some form of user input such as a touchscreen or mouse, a communications channel dedicated to communication to the JACE and sufficient software (i.e., operating system, application software) to accomplish communication with the JACE and rendering of user interfaces.

An issue may be addressed by the present invention. The Tridium NiagaraAX framework provides software tools and a methodology for constructing user interfaces for NiagaraAX-based solutions. The NiagaraAX framework only supplies tooling and methodology for native NiagaraAX embedded touch screens using Niagara PX pages and for web-based embedded displays using Niagara HX pages. The framework does not provide an approach for constructing user interfaces for embedded displays that are not implemented using these specific technologies.

A solution may be provided by the invention with an approach and apparatus for constructing embedded display content and navigation for NiagaraAX-based solutions when the display rendering technology is not Niagara thick client (PX) or Niagara thin client (HX), or other Niagara-based display rendering technology. The invention is significant because it leverages the existing NiagaraAX Workbench tooling to generate displays rendered in heterogeneous technologies, thus extending the range and richness of user interface experience for Niagara-based systems. Users and integrators, familiar with NiagaraAX Workbench tools and workflow, may easily create rich user interfaces for their NiagaraAX-based systems which may then be rendered and used by a variety of display platforms independent of vendor technology. The invention accomplishes the solution by providing a combination of software components on the NiagaraAX side of the architecture and on the embedded display side in combination with a workflow for definition of screens and navigation.

Elements of the invention may cover the NiagaraAX domain. A portion of the invention may be provided by the NiagaraAX-side components. The NiagaraAX components are resident in a so-called NiagaraAX device driver. The components consist of display and navigation definition elements and also a communications driver 11 that transfers information between the NiagaraAX system 12 and the heterogeneous embedded display device 13, as shown in FIG. 1a.

The communications device driver 11 is responsible for transfer of data between the NiagaraAX system 12 and the embedded display device 13. The driver 11 consists of several parts. One is a low-level driver 14 for transferring packets over the communications link with software resident on both the NiagaraAX system 12 and the embedded display 13. Another is a high-level software component 15 to read and write NiagaraAX objects including data points, alarms and screen definitions/navigation information to/from the low-level driver 14.

The following transfers 16 may be performed between the embedded display 13 and the NiagaraAX system 12. The transfers 16 may include screen definitions from NiagaraAX to the display, screen navigation hierarchy from NiagaraAX to the display, live data from NiagaraAX to the display, user-initiated data updates from the display to NiagaraAX, alarm objects from NiagaraAX to the display, and alarm acknowledgements from the display to NiagaraAX.

There may be data selectors which are a collection of components or objects to represent data items. The invention may provide a set of NiagaraAX objects that are used for representation of data items to be displayed on the embedded display device. These objects are contained in the "palette" of the NiagaraAX device driver. NiagaraAX provides a means of exposing data items from its objects, hereafter referred to as "Slots". Slots are the building blocks for defining both simple and complex data objects. Simple data objects are wrappers for the low-level, primitive data types which are composed of a name, units/scaling definition, and data value. Complex data objects provide additional software behavior for subscription and data proxy across external devices, hereafter referred to as "Points".

Components or objects may be provided by the invention to represent NiagaraAX primitive types and point-based types. For the invention, these objects may be used for selecting which data items are represented on the embedded display. They link the source data objects on the NiagaraAX system to the destination data display items on the embedded display device.

Simple data items may be noted. Components/objects may be provided by the invention for accessing NiagaraAX simple data items of Integer, Long, Float, Double, Boolean, Enumeration and String NiagaraAX primitive types.

Point-based data items may be noted. Components/objects may be provided by the invention for accessing NiagaraAX Point-based data items of Numeric, Boolean, Enumeration and String NiagaraAX Point types.

Screen Schemas may be a collection of components to represent screens. The invention may provide a set of NiagaraAX objects that are used for representation of screens and the corresponding navigational relationship between them. These objects are contained in the "palette" of the NiagaraAX device driver.

There may be several screen types. The invention may provide general classes of screen definition objects which include a home screen, static list screens, dynamic list screens, editing screens, an alarm viewing screen, an alarm details screen, a display device configuration screen, a user login screen, and a hot-link definition object. A home screen is the first screen in the hierarchy, which may provide the same items as a static list screen plus additional system overview and context information. Static list screens may provide a set of buttons or links that are primarily intended to navigate to other screens in the hierarchy. The list may provide a set of user-definable links that define navigation buttons that will navigate to a specified screen when pressed. Provision may be made for a user defined name and associated navigate-to screen.

Dynamic list screens may provide a list-based container for displaying and manipulating data items. Data items that have write capability will also serve as links/buttons to navigate to an appropriate data editing screen. There may be editing screens for Boolean, enumeration, string and numeric-typed writable values. An alarm viewing screen may provide a list view of NiagaraAX alarms with navigation to an alarm details screen. The alarm details screen may provide detail information on a single NiagaraAX alarm with a provision for user acknowledgement of the alarm. A display device configuration screen may be a screen for performing a configuration of local parameters for the embedded display device, such as display contrast, color schemes, backlight dimming, and so forth.

There may be a user login screen for the embedded display device. A hot-Link definition object may be for customization of "hot-link" buttons common to all displays. The object may provide at least four user-definable links that may be used to provide persistent buttons on the display that navigate to arbitrary points in the screen hierarchy. User may define the name of the hot link and its associated "navigate-to" screen.

There may be link slots. Each NiagaraAX object used for screen representation may provide two NiagaraAX Slots in its definition for connection of screens to define the navigation hierarchy and flow. These Slots may be referred to as the ParentScreen and HotLink slots. The ParentScreen is used to connect a screen to its predecessor in the hierarchy. Normally, this connection is made from a Static List screen item's navigate-to element to the desired screen's ParentScreen slot. The HotLink slot is used to connect so-called common hot-link buttons in the Hot-Link definition object to the screen.

There may be a preview mode. Screen definitions may be performed by the invention using the NiagaraAX Workbench tool's "wiresheet" editor and its "navtree" sidebar. A selection of screens and navigation hierarchy definition is performed in the wiresheet editor. The invention may provide a means for a "what you see is what you get" (WYSIWYG) preview of the defined user interface. The embedded display's operating system, software and display rendering technology is not necessarily native NiagaraAX. The screen definition elements of the invention are designed to run in the PC-based NiagaraAX workbench tool; therefore, the invention provides for execution of a subset of the embedded display's software sufficient to allow meaningful rendering of the defined user interface. The execution of the embedded display's software subset is triggered by a so-called "right-click" NiagaraAX Action. This action may be defined for all screen definition elements or objects. When a user "right-clicks" on a screen definition object in the wiresheet editor and selects the "Preview" action, the screen definition object will launch a PC-based subset of the embedded display's software and transfer the relevant screen definition data from the NiagaraAX context into the now-executing embedded display software subset to accomplish the WYSIWYG preview mode.

Elements of the invention may cover the embedded display domain. A portion of the invention may be resident on the embedded display device.

There may be a BOG Snippet Interpreter. The totality of the screen definitions, screen navigation and data item selections are performed within the NiagaraAX Workbench tool and result in a series of NiagaraAX objects being persisted to a NiagaraAX Station's so-called BAJA Object Graph (BOG). The invention may provide an approach to collect this data on the NiagaraAX side and transfer it to the embedded display. The complete data set for the embedded display definition may be contained hierarchically in a single Folder object in the BOG. The invention transfers the definition by means of a "right-click" NiagaraAX Action on the Folder object. When invoked, the action uses the NiagaraAX BOG encoding functionality to encode the objects within the Folder to an XML formatted representation and transfers the representation via the communications driver to the embedded display device. The XML formatted representation may be referred to as a BOG snippet.

Once the BOG snippet is received, the embedded display device then decodes the XML data and populates an internal database to be used for rendering screens and navigating between them. Navigation relationships between screens are determined by matching up XML "link" elements in destination screens to their source screen. NiagaraAX provides sufficient data within the XML "link" elements to match the source screen to its destination screen unambiguously. The mapping of data items to data display screens is obtained by establishing child relationships of data items to a parent screen by inference. If a data item appears as a child element in the XML definition of a screen, it is assumed to be a member of that screen.

An approach of unambiguously referencing NiagaraAX objects between the NiagaraAX system and the embedded device may be accomplished by use of the XML "h" attribute provided for each object in the BOG. NiagaraAX assigns a unique integer id to each NiagaraAX object that provides an unambiguous reference to the object. The id may be used to retrieve the object for read/write operations. In NiagaraAX this unique id is referred to as a handle. The handle is encoded as the "h" attribute of an object in the BOG snippet XML. The numeric value is stored by the embedded display and is then used for later reads and writes of data values and other items between the embedded display device and the NiagaraAX system.

There may be screen generation and navigation. The embedded display device constructs and maintains an internal database for use in screen generation and navigation. This database is derived from the BOG snippet interpreter. In one approach, the invention may convert the hierarchical XML definition in the BOG snippet into a relational database representation so that navigation relationships are easily attainable via simple database queries rather than a repeated iterative decomposition of the XML.

The invention may provide a database-driven screen navigation engine. The engine is event-driven from user interface actions on the embedded display. The primary events are button presses. The initial state of the engine is the display of the Home screen and thereafter button presses cause state transitions. When the user presses a button in either a static list screen or a dynamic list screen, the engine performs a database query to determine the next screen associated with the button press and causes rendering of that screen to occur.

The invention may provide a database-driven screen rendering engine. For a given screen, the rendering engine determines the type of screen and its required elements from the database entry for the screen and generates/displays it using the rendering technology of the display device, for example (but not limited to), Windows Forms.

Figure 1B:
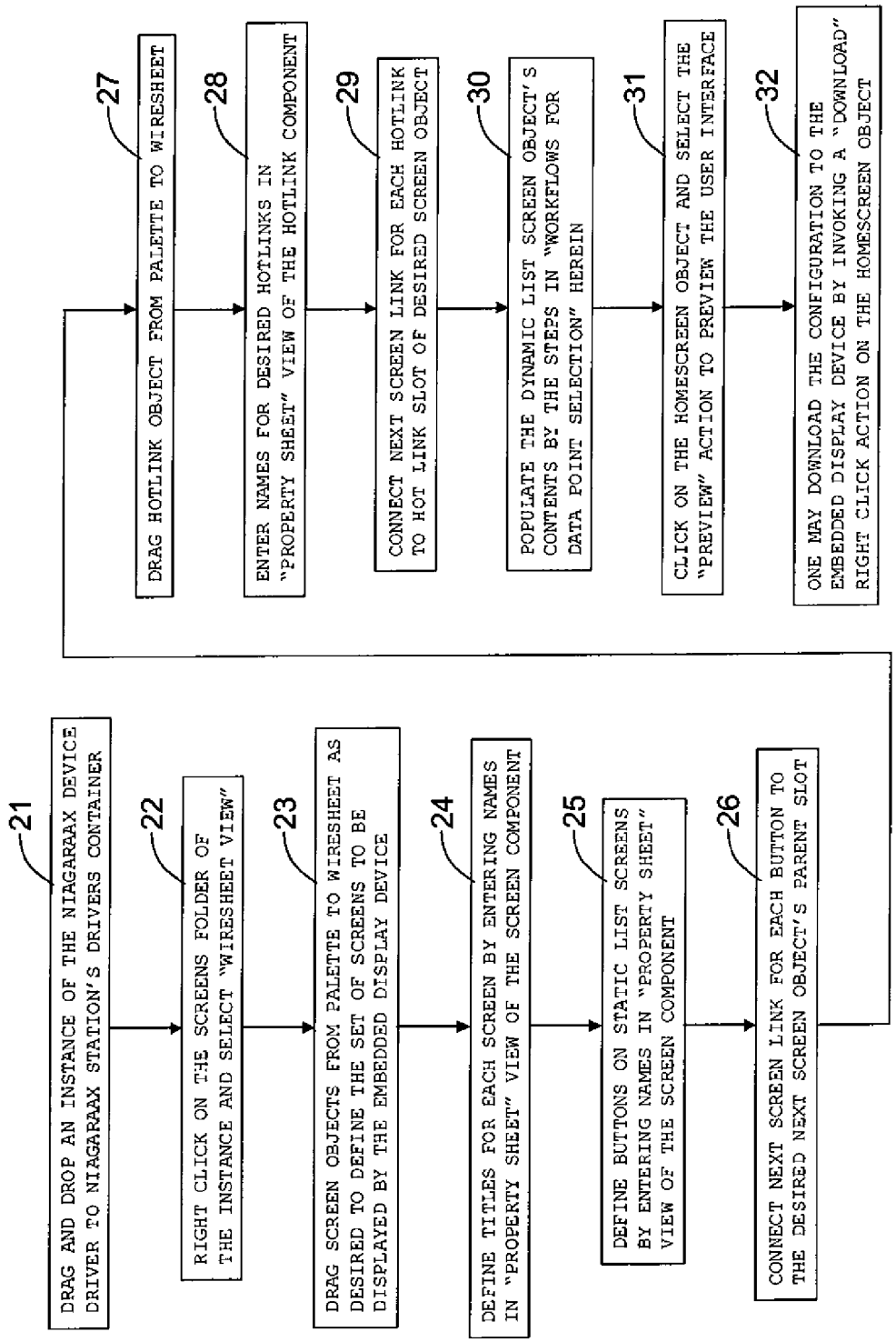
FIG. 1b is a diagram of steps which a user may follow for screen definition.

There may be workflows for screen definition. FIG. 1b shows steps which a user may follow for screen definition. First, one may drag and drop an instance of the NiagaraAX device driver to NiagaraAX station's Drivers container, as shown in block 21. Second, one may right click on the Screens folder of the instance and select "wiresheet view" in block 22. Third, in block 23, one may drag screen objects from palette to wiresheet as desired to define the set of screens to be displayed by the embedded display device. A homescreen object may be automatically included. Fourth, one may define titles for each screen by entering names in "property sheet" view of the screen component in block 24. Fifth, in block 25, one may define buttons on Static List screens by entering names in a "property sheet" view of the screen component.

Sixth, one may connect a next screen link for each button to the desired next screen object's parent slot in block 26. Seventh, one may drag a HotLink object from the palette to the wiresheet in block 27. Eighth, one may enter names for desired hotlinks in the "property sheet" view of the HotLink component in block 28. Ninth, in block 29, one may connect a next screen link for each hotlink to a Hot Link slot of a desired screen object. Tenth, in block 30, one may populate the Dynamic List Screen object's contents by the steps in "Workflows for data point selection". Eleventh, one may right click on the Homescreen object and select the "Preview" action to preview the user interface in block 31. Twelfth, in block 32, one may download the configuration to the embedded display device by invoking a "Download" right click action on the Homescreen object.

There may be workflows for data point selection. The following steps may be used for selection of data points within dynamic list screens in the invention. First, one may identify a NiagaraAX source Slot or Point desired for inclusion in the screen and determine its data type from the NiagaraAX Workbench user interface. Second, one may drag and drop an appropriately-typed data selector object from the palette to the desired dynamic list screen object in the navtree. Third, with the navtree, one may locate the source slot/point and execute a right-click "link mark" action. Fourth, with the navtree, one may locate the data selector object from the second step and execute a right-click "link-from" action. Fifth, one may repeat the first through fourth steps for all points to be added to the desired screen.

Figure 2:
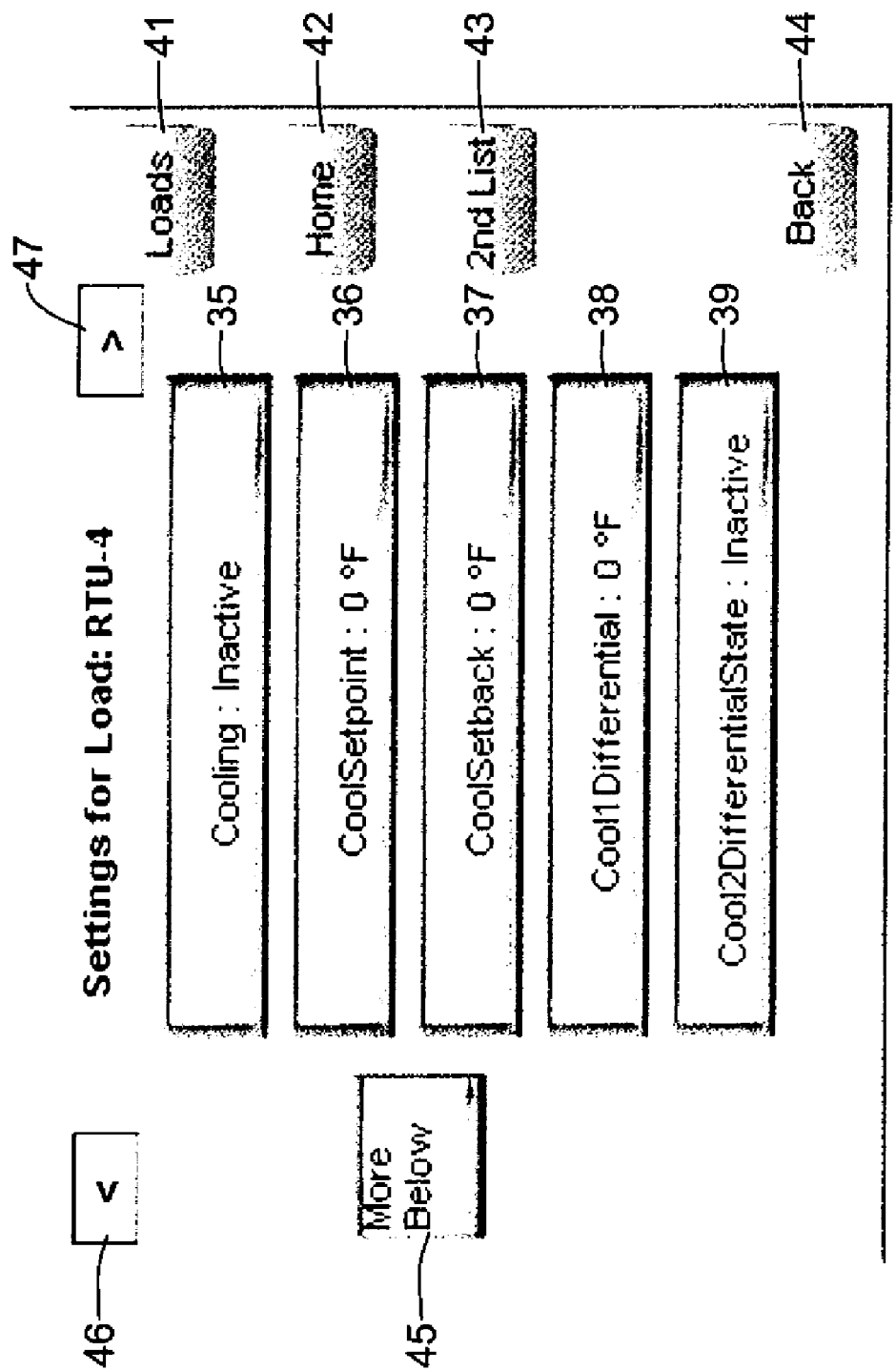
FIG. 2 is a diagram of an illustrative example of dynamic list screen generated by the present system.

There may be an example of a user interface. FIG. 2 shows an example dynamic list screen generated by the invention. Buttons 35-39 in the center column correspond to NiagaraAX "Slot" data items. These buttons may be settings relative to, for example, a "Load: RTU-4". Buttons 35, 36, 37, 38 and 39 may represent, for instance, "Cooling: Inactive", "CoolSetpoint: 0° F.", "CoolSetback: 0° F.", ":Cool1Differential: 0° F.", and "Cool2DifferentialState: Inactive", respectively. Button 45 indicates "More Below". Buttons 41-44 on the right column are Hot Link buttons that navigate to other screens in the hierarchy. The buttons 41, 42, 43 and 44 may represent, for instance, "Loads", "Home", 2nd List", and "Back", respectively. Buttons 46 and 47 may represent a lateral movement, left and right, respectively, for similar settings of another mechanism.

Figure 3:
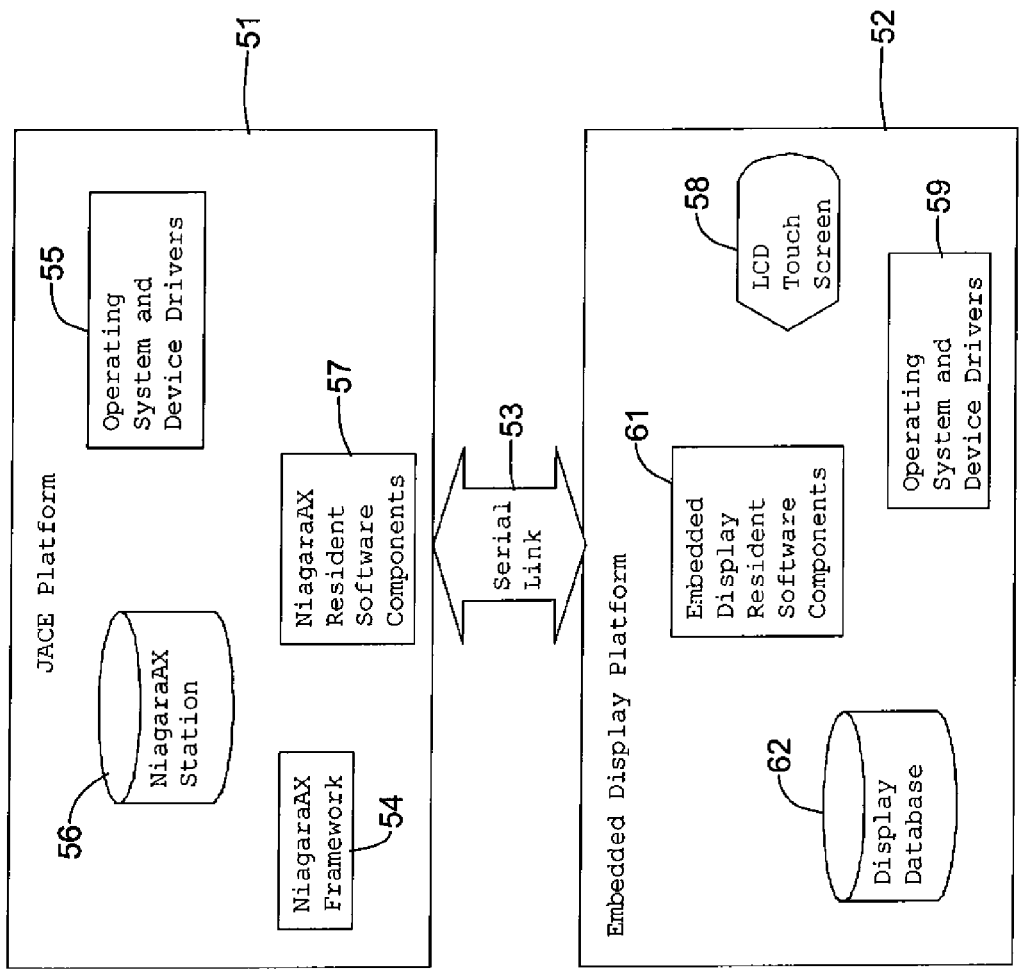
FIG. 3 is a top-level diagram of system components for the present approach for definition of embedded touch screen user interfaces.

FIG. 3 is a top-level diagram of system components for the present method and apparatus for definition of embedded touch screen user interfaces. This diagram presents a simplified view of the major hardware and software components comprising the invention. A "JACE Platform" 51 is a Tridium JACE computing platform 51 running the NiagaraAX software framework 54 and its associated operating system and device drivers 55. A "NiagaraAX Station" 56 is its associated runtime database of NiagaraAX objects. There may also be NiagaraAX resident software components 57. An "Embedded Display Platform" 52 is an embedded computing platform with LCD touch screen 58 user interface and any required operating system and device drivers 59. There may also be embedded display resident software components 61 and a display database 62. The two platforms may communicate via a serial data link 53.

Figure 4:
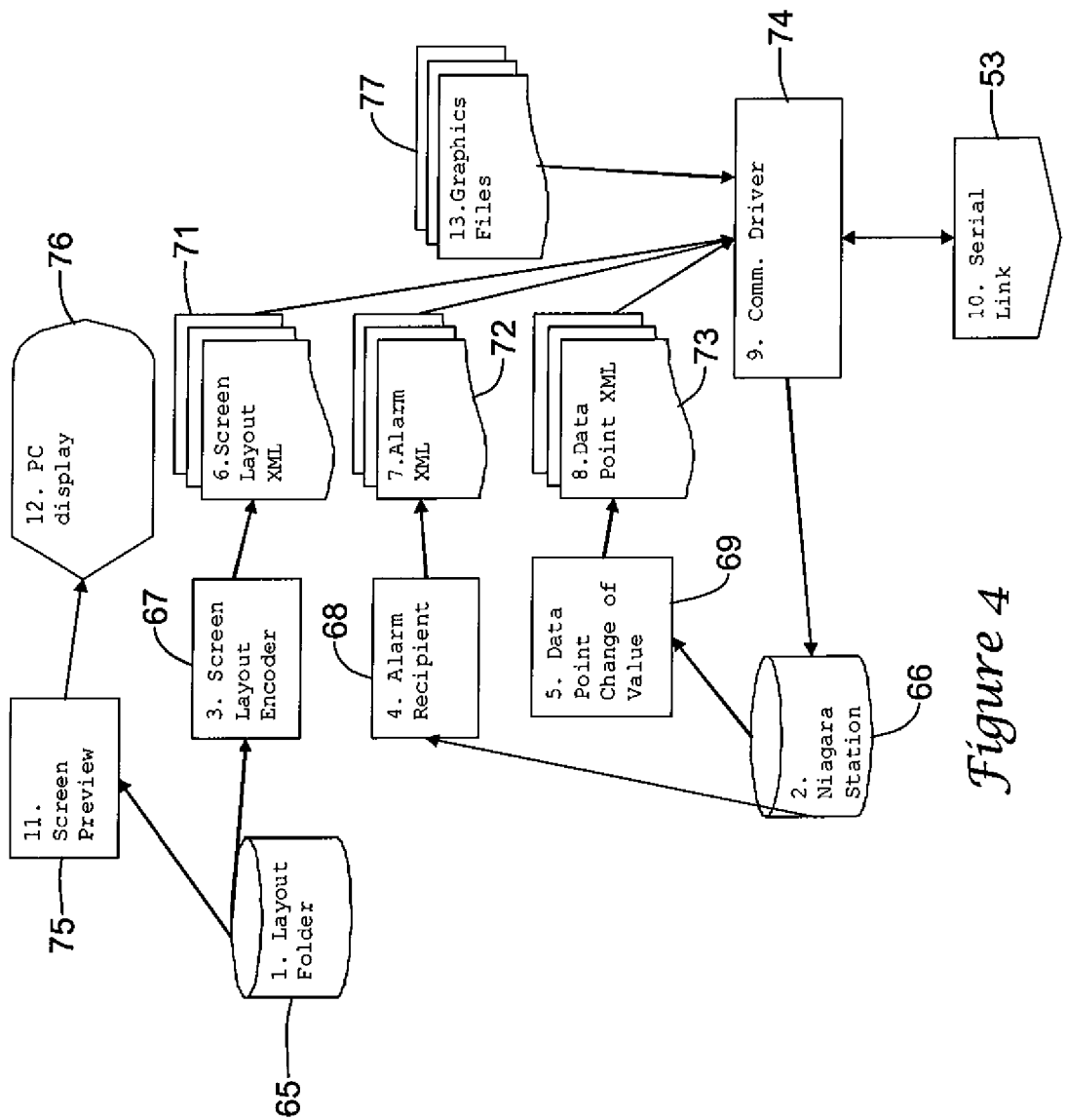
FIG. 4 is a diagram of NiagaraAX resident software components.

FIG. 4 is a diagram of NiagaraAX resident software components. The diagram may be a basis for a description of the internals and artifacts for the NiagaraAX resident software components. A description of each of the items and interconnects may be shown in the following.

First, a layout folder 65 represents the collection of NiagaraAX objects that comprises a set of screen definitions for an embedded display device. This may consist of a top level screen layout folder, a home screen object and a collection of hierarchically associated screens and their display elements. This folder may be constructed with the Niagara Workbench tool.

Second, the Niagara station 66 is the host entity for the NiagaraAX components. Its database of points and alarms is the source for the data point change of value component and alarm recipient component respectively and it serves as a data sink for data point changes from the embedded display device.

Third, a screen layout encoder 67 converts the collection of objects in the layout folder into a hierarchical XML document (Screen Layout XML) that is transferred to the embedded display device.

Fourth, an alarm recipient component 68 intercepts NiagaraAX alarms and converts them into XML documents (Alarm XML) for use by the embedded display device.

Fifth, a Data Point Change of Value component 69 monitors NiagaraAX data points used by the embedded display device and causes propagation of an XML document (Data Point XML) to the embedded display device upon a change of value for the given point.

Sixth, a screen layout XML 71 is a hierarchical representation of the screen definitions for the embedded display device defining each screen and its contents as well as navigation flow. Seventh, an alarm XML 73 is an XML representation of a NiagaraAX alarm.

Eighth, a data point XML 73 is an XML representation of a NiagaraAX data point including value, facets and name. Ninth, a communications driver 74 is a NiagaraAX serial device driver which communicates with the embedded display device. It is responsible for transferring screen layout, alarm, data point values and graphics files to the embedded device and for receiving data point changes from the embedded display device.

Tenth, a serial Link is a serial data link between the JACE platform and the embedded display device; it may be implemented with a variety of physical layers (i.e. RS232, RS485).

Eleventh, a screen preview is a software component that provides a "What You See Is What You Get" (WYSIWYG) preview of the screen definition set upon demand. In a first version, this component executes only when used from Niagara Workbench and runs as an independent process/executable on the PC running Niagara Workbench.

Twelfth, a PC display 76 represents display technologies upon which the screen preview executes. Thirteenth, graphics files 77 may have some screen elements (i.e., NodeButtons) that provide for a user specification of a background image file (*.png, *.jpg, and so forth). These elements may be transferred from the JACE to the embedded display device as needed.

The interconnection of the components in FIG. 4 may be noted. The communications driver 74 may have an in and out connection to serial link 53. Screen layout XML 71, Alarm XML 72, data point XML 73, and graphics files 77 may have outputs to the communications driver 74. Communications driver 74 may have an output to the Niagara station 66 which in turn has outputs to alarm recipient 68 and data point change of value component 69. Alarm recipient 68 may have an output to the alarm XML 72. The data point change of value component 69 may have an output to the data point XML 73. Layout folder 65 may have outputs to screen layout encoder 67 and screen preview component 75. Screen layout encoder 67 may have an output to screen layout XML 71. The screen preview component 75 may have an output to the PC display 76.

Figure 5:
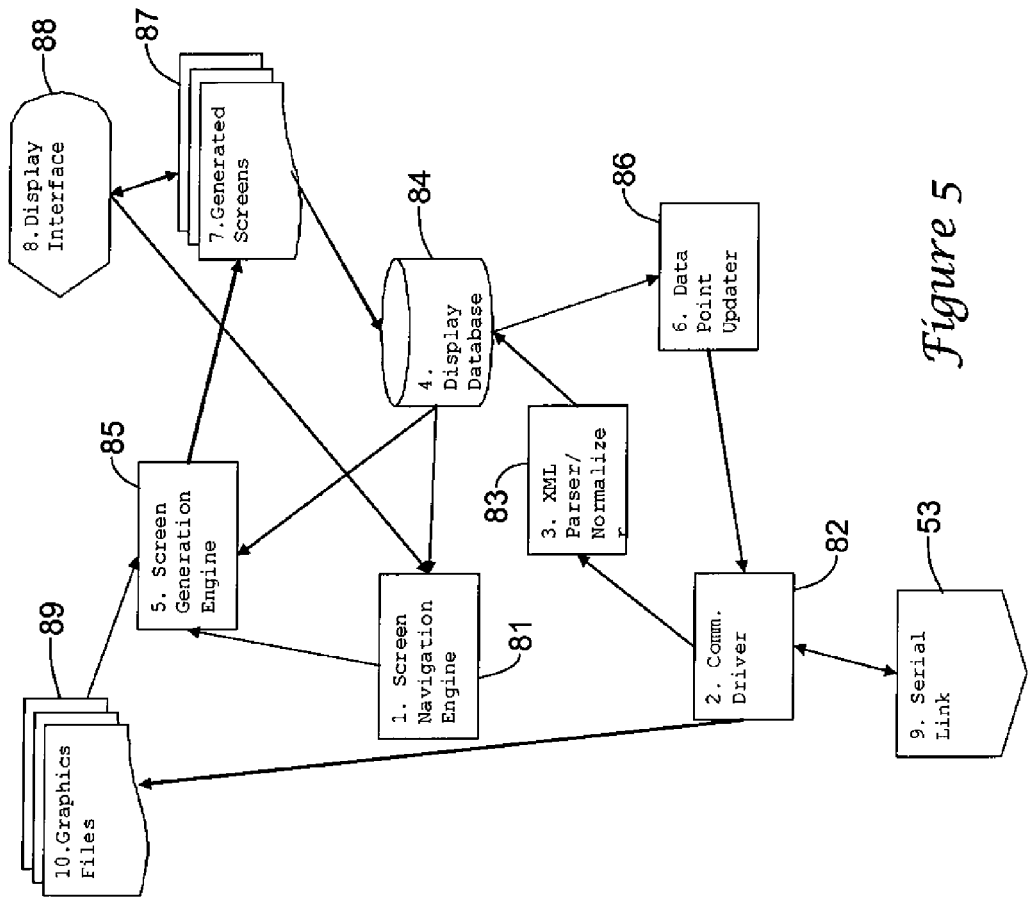
FIG. 5 is a diagram of embedded display resident software components.

FIG. 5 is a diagram of embedded display resident software components. This diagram provides a description of the internals and artifacts for the embedded display resident software components. A description of each of the items and interconnects is shown herein.

First, a screen navigation engine 81 is a software component that monitors GUI events such as button presses and causes navigation to the appropriate "next" screen. This component determines the appropriate next screen by interpretation of the defined parent-child relationships for screens and their elements defined in the display database.

Second, a communications driver 82 is a software component that accepts screen layout, alarm, data point values and graphics file transfers from the JACE and sends data point updates from the embedded display device.

Third, an XML parser/normalizer 83 is a software component that translates Screen Layout XML, Alarm XML and Data Point XML documents into relational database format. In the case of the Screen Layout XML, this component is responsible for inferring parent-child relationships between screens, buttons and other display elements so that navigation hierarchy may be easily determined by database queries.

Fourth, a display database 84 is a relational data storage mechanism used for holding screen definitions, data points and alarms. Fifth, a screen generation engine 85 is a software component that interprets relational database records comprising a screen and renders them with a suitable GUI technology. Minimum required GUI elements may include windows, buttons, textual display, graphics image display, and eventing.

Sixth, a Data Point Updater 86 is a software component that monitors data points in the display database. When a screen causes changes to a data point value, this component sends a data point update message to the JACE so that the change may be recorded.

Seventh, generated screens 87 are the results of the screen generation engine which may be a collection of GUI elements represented in a suitable GUI technology that accomplishes intended display and user interactions.

Eighth, a display interface 88 is a graphical pixel-based display with some form of user input mechanism (touch screen, mouse). Ninth, a serial link 53 is like the serial link in FIGS. 3 and 4. Tenth, graphics files 89 may be like the graphics files 77 in FIG. 4.

The interconnection of the components in FIG. 5 may be noted. The communications driver 82 may have an in and out connection with the serial link 53. The data point updater 86 may have an output to communications driver 82. Outputs from the communications driver 82 may go to the XML parser/normalizer 83 and the graphics files 89. The XML parser/normalizer 83 may have an output to the display database 84. The graphics files 89 may have an output to the screen generation engine 85. The display interface 88 may have an in and out connection with the generated screens component 87 and an output to the screen navigation engine 81. The screen navigation engine 81 may have an output to the screen generation engine 85 which in turn may have an output to the generated screens component 87. The generated screens component 87 may have an output to the display database 84. The display database 84 may have outputs to the screen navigation engine 81, the screen generation engine 85 and the data point updater 86.

Display definition may be provided with NiagaraAX resident software. A simple example using the NiagaraAX resident software for display definition may be provided. The following steps are provided as an example to illustrate concepts of the configuration operations with the present invention.

Figure 5A:
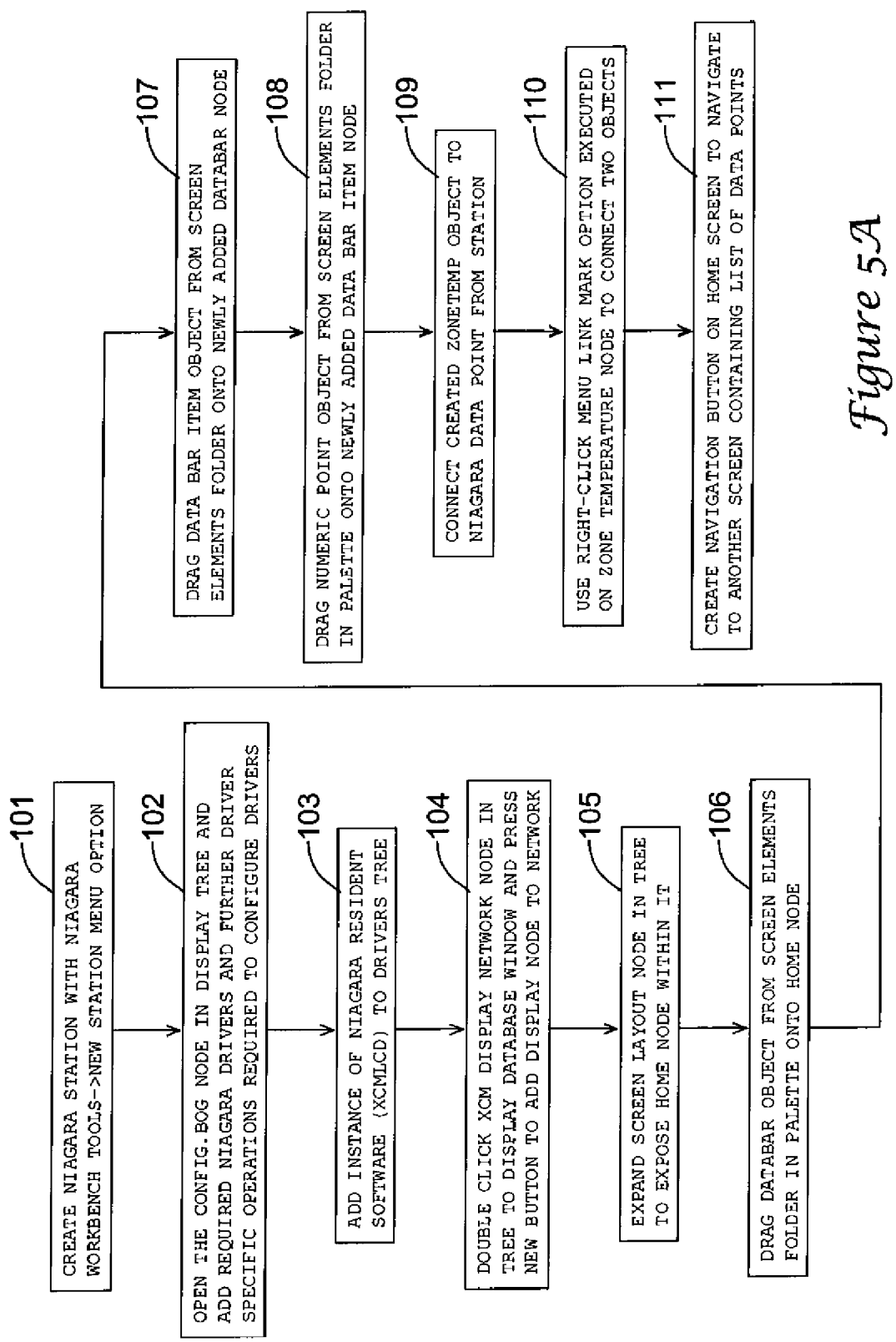
FIG. 5a is a diagram of example steps for providing display definition with Niagara resident software.
Figure 6:
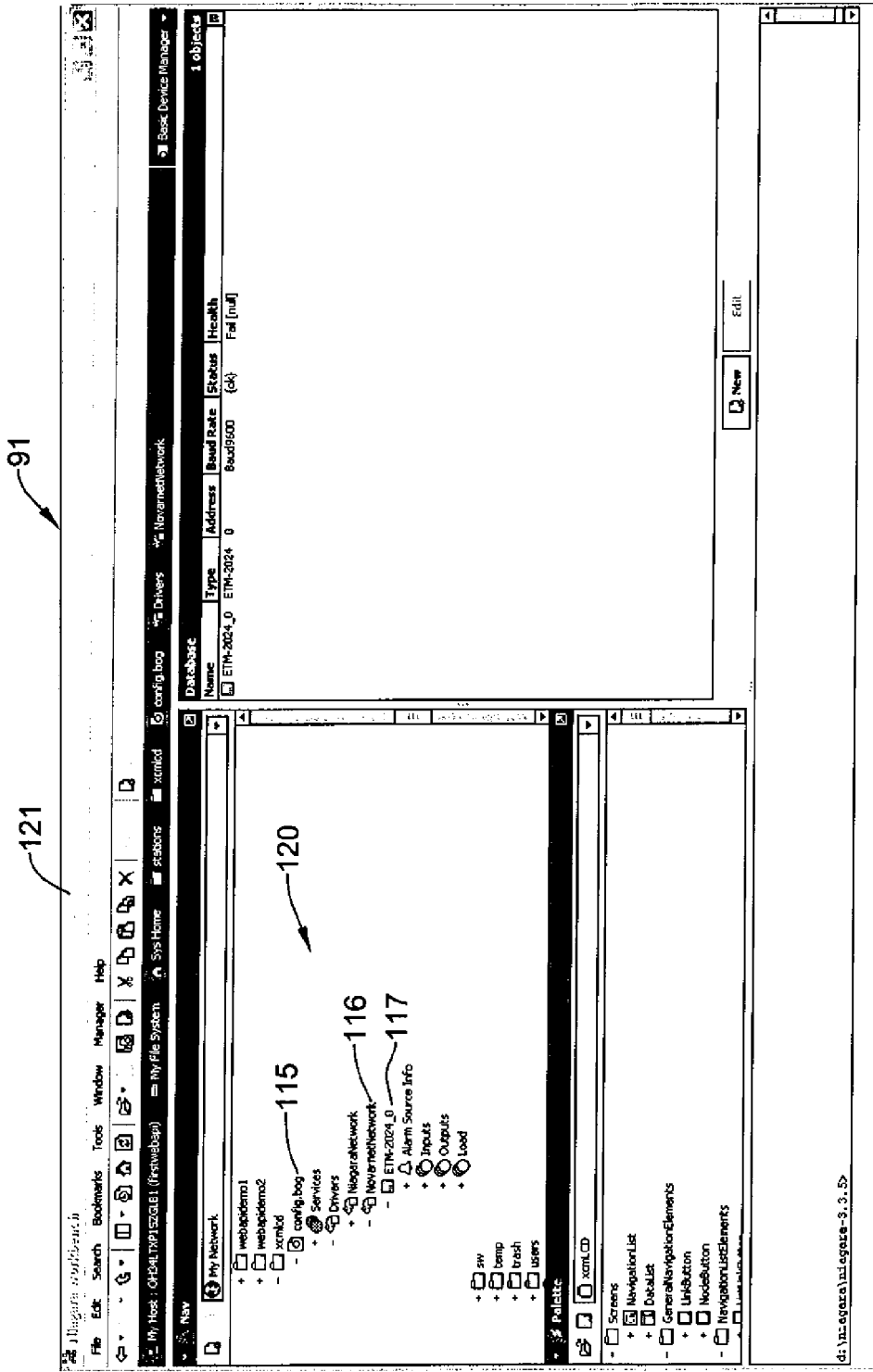

First, one may create a NiagaraAX station with NiagaraAX Workbench Tools→New Station menu option as in block 101 of FIG. 5a. Second, in block 102, one may open the config-.bog node 115 in the display tree 120 in FIG. 6 and add any required NiagaraAX drivers and further driver specific operations required to configure the drivers. In general, this may involve adding devices and other NiagaraAX objects to the driver instance. FIG. 6 shows a screen shot 91 of a Novarnet-Network driver 116 with one ETM2024 device 117.

Figure 7:
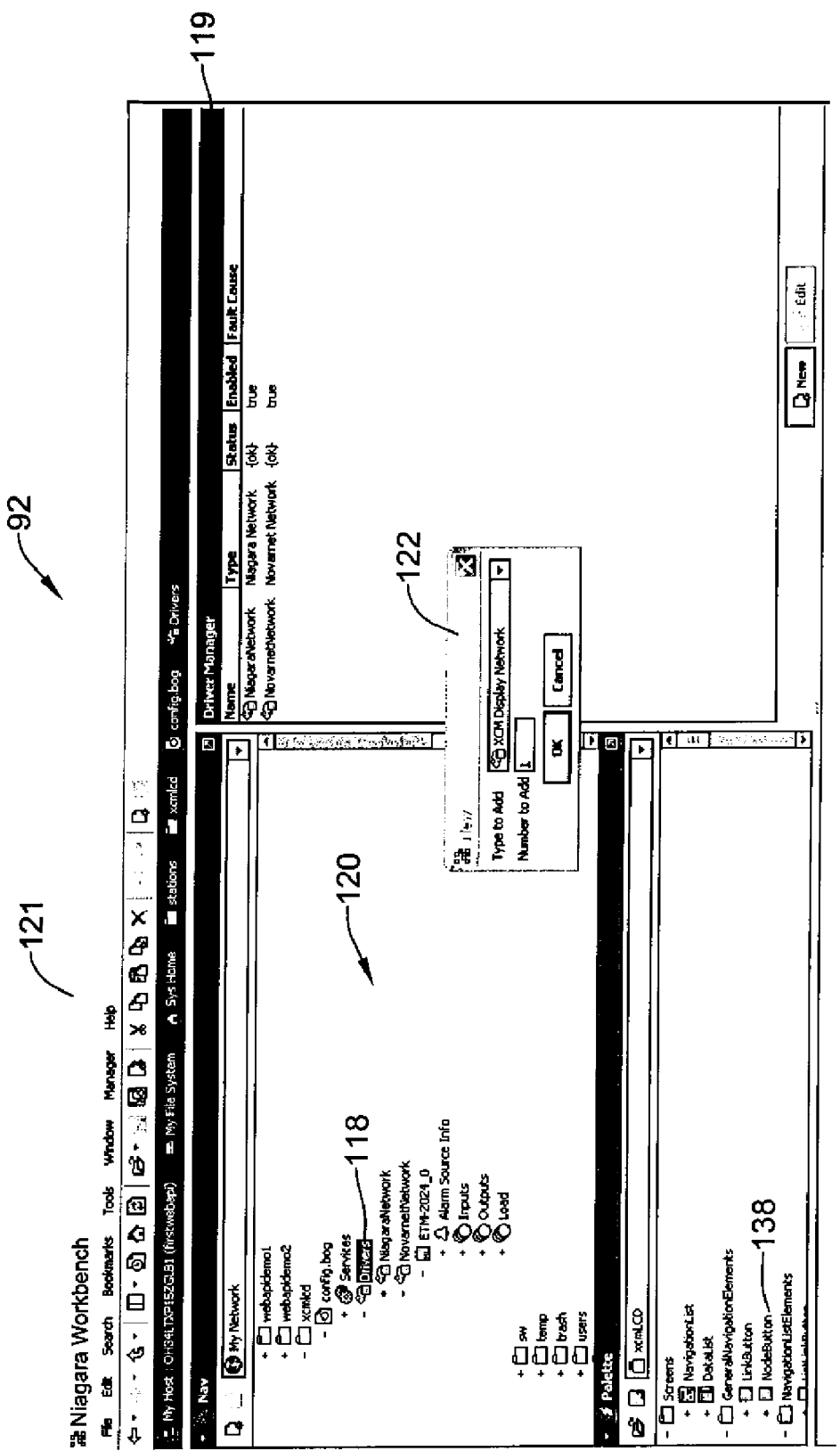

Third, in block 103, one may add an instance of the Niagara resident software (herein referred to as xcmLCD) to the drivers tree. One may double click the drivers node 118 to display the driver manager window 119 in the Niagara Workbench 121, press the new button 122 and select the XCM display network driver as shown in the screenshot 92 of FIG. 7.

Fourth, as in block 104, one may double click the XCM-DisplayNetwork node 123 in the tree to display the database window 124, press the new button to add a display node to the network. The resultant tree is shown in the screenshot 93 of FIG. 8. The display node 125 represents the embedded display device. A screen layout folder is automatically created. This folder may contain all screen definitions for the embedded display device. A home node is automatically included in the folder to represent the top-most screen in the hierarchy.

Fifth, as in block 105, one may expand the screen layout node in the tree to expose the home node within it. One may open the xcmLCD palette 126 in the Workbench tool 121. The opened xcmLCD palette may be visible in the screenshot 93 of FIG. 8. This provides access to the screen definition elements to be used in subsequent steps.

Figure 8:
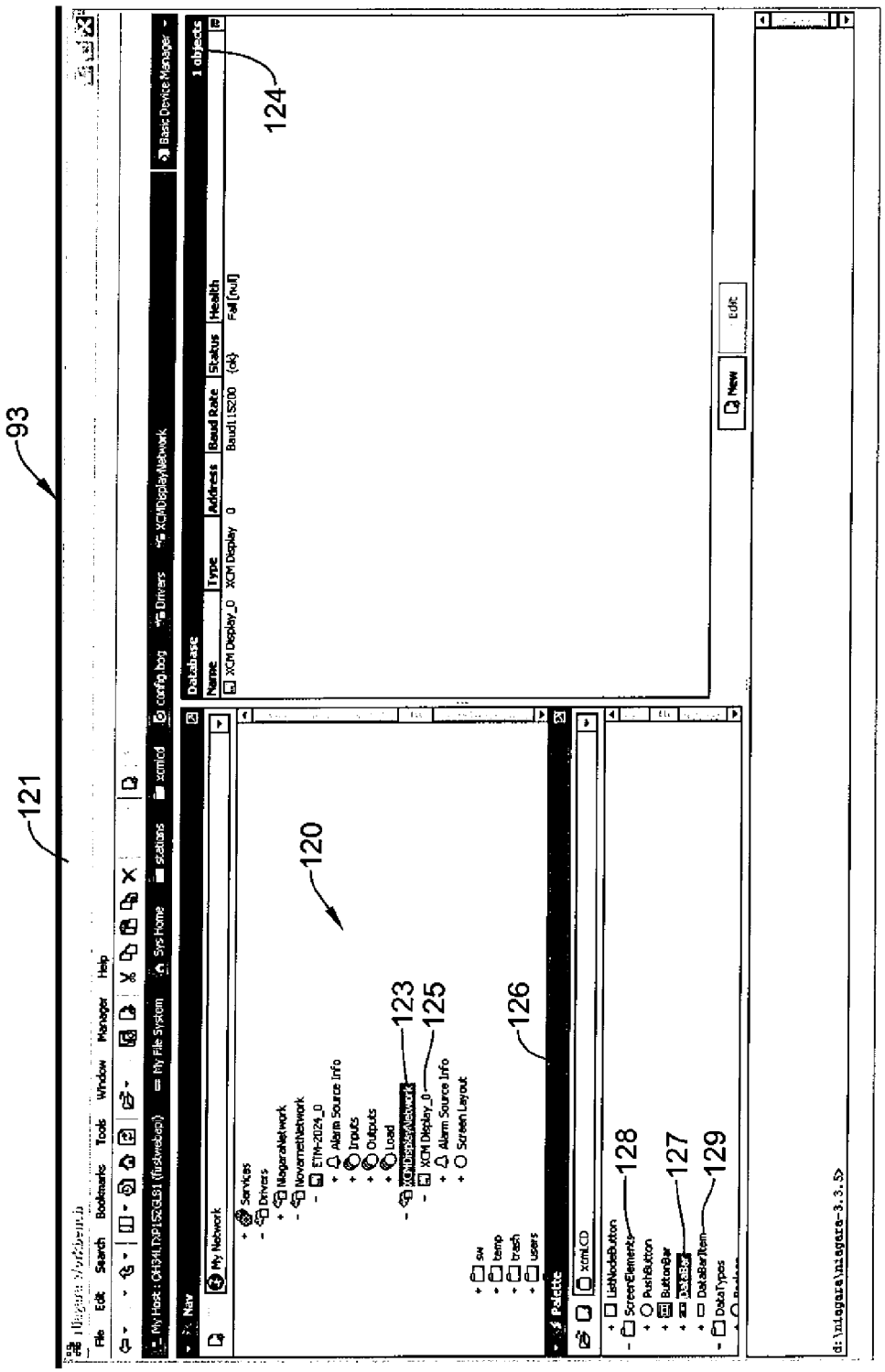
Figure 9:
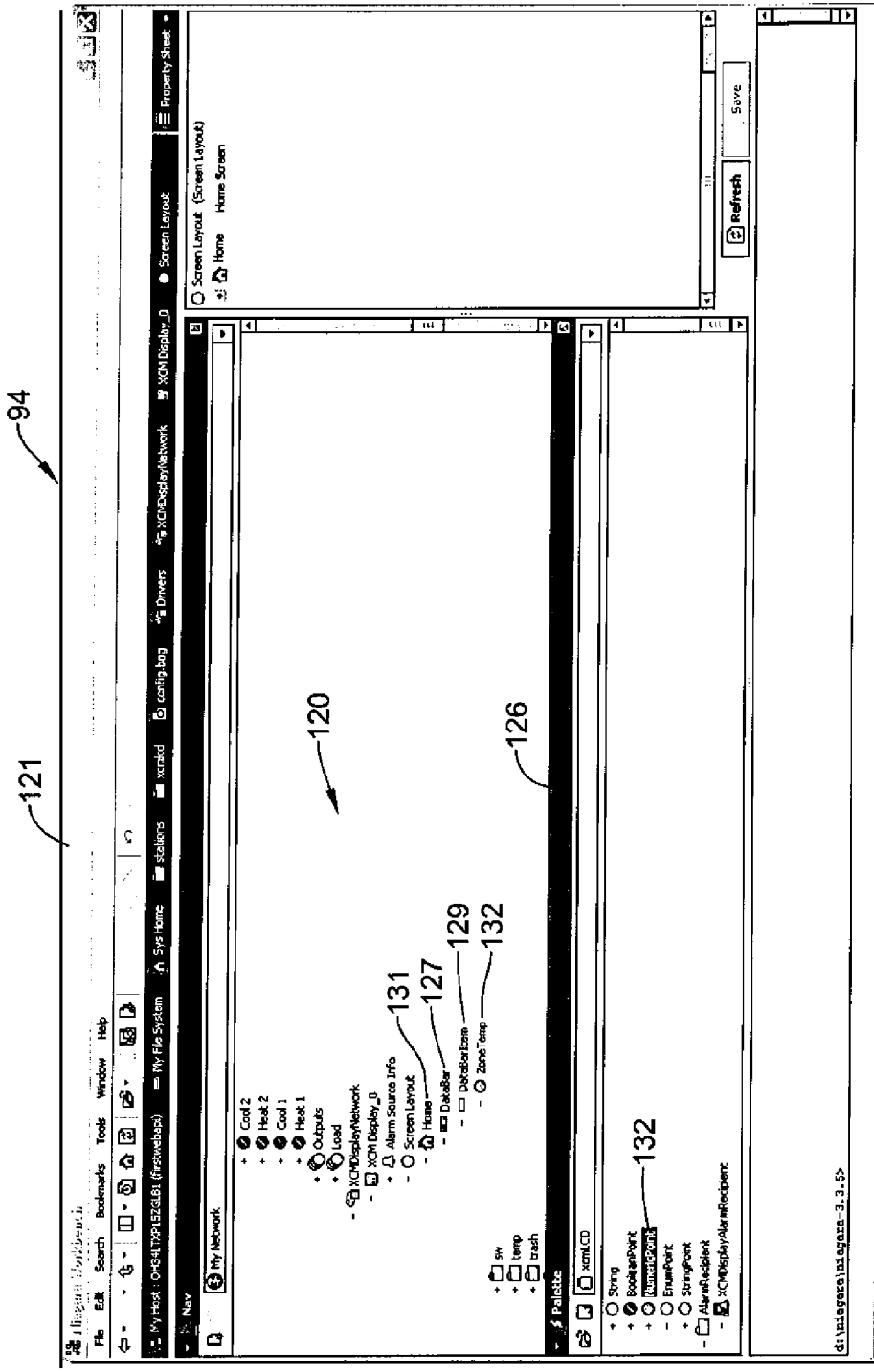

Sixth, as in block 106, one may drag a DataBar object 127 from the ScreenElements folder 128 in the palette 126 of FIG. 8 onto the home node 131 shown in FIG. 9. The DataBar object 127 represents a summary/status area specific to the home screen to be used for displaying system-wide data values of interest to the user.

Seventh, as in block 107, one may drag a DataBarItem object 129 from the ScreenElements folder 128 onto the newly added DataBar node. This object may be a container for a NiagaraAX data point. The label for the DataBarItem 129 (i.e., the text that is displayed for it on the display) may be changed by means of the Workbench property sheet view of the DataBarItem node.

Eighth, as in block 108, one may drag a NumericPoint object 132 from the ScreenElements folder 128 in the palette 126 onto the newly added DataBarItem node 129. One may use the right-click menu rename option on the NumericPoint object to change its name to ZoneTemp 132. The resultant tree produced by steps 6-8 is shown in the screen shot 94 of FIG. 9.

Figure 10:
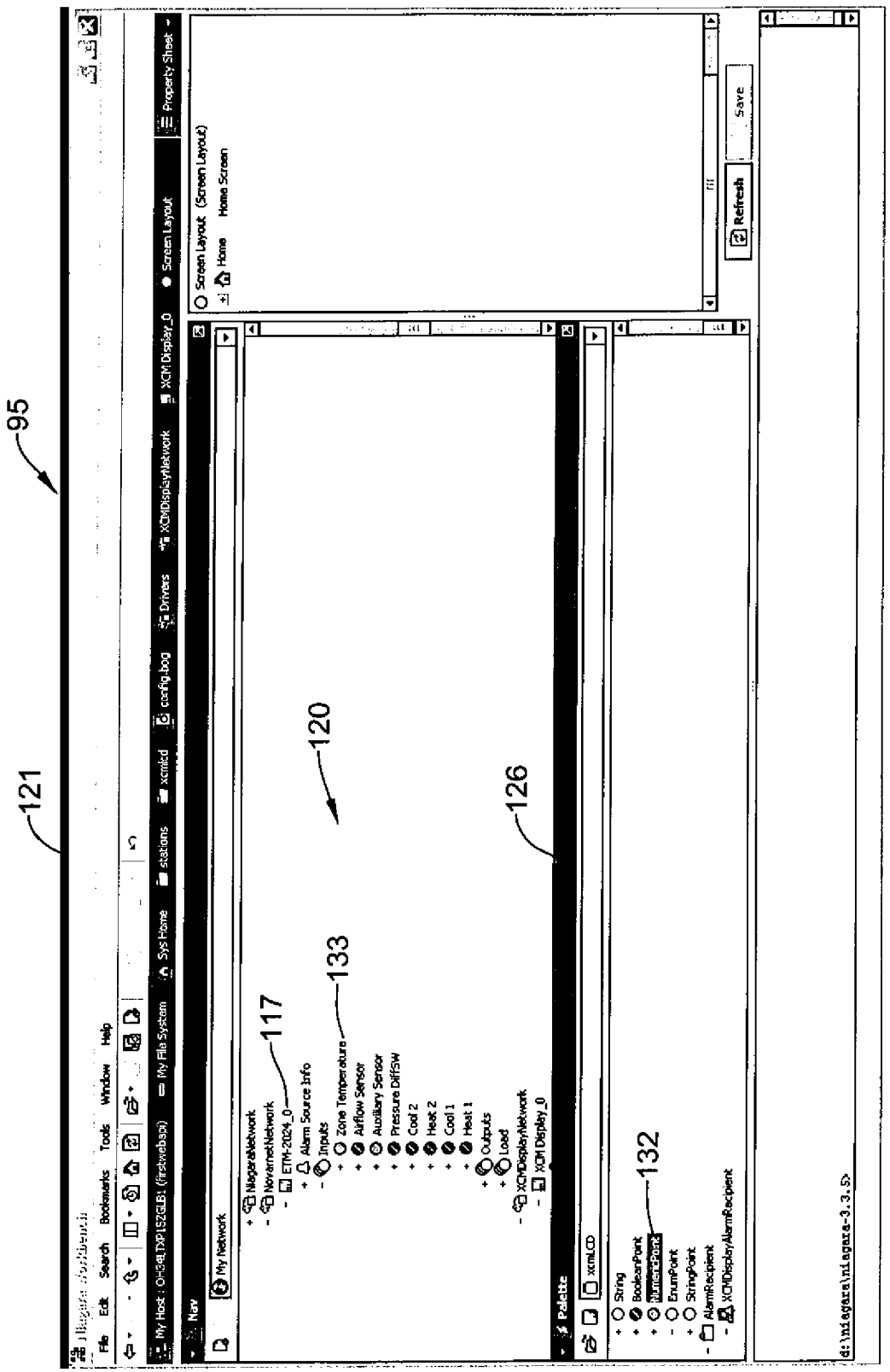

Ninth, as in block 109, one may connect the ZoneTemp object 132 created in the eighth step to a NiagaraAX data point from the station. In the example system, it may be connected to the zone temperature data point 133 from the ETM-2024-0 device 117 underneath the inputs folder of that device. This point is visible in the screen shot 95 of the tree in FIG. 10.

Figure 11:
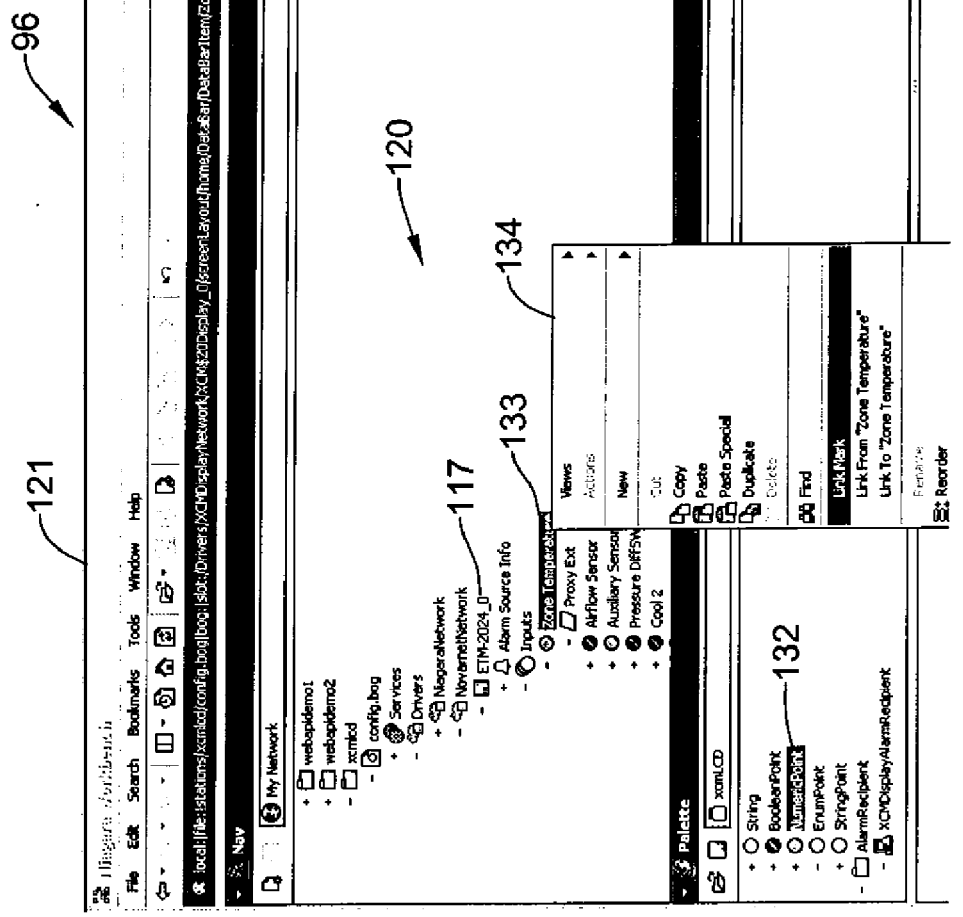
Figure 12:
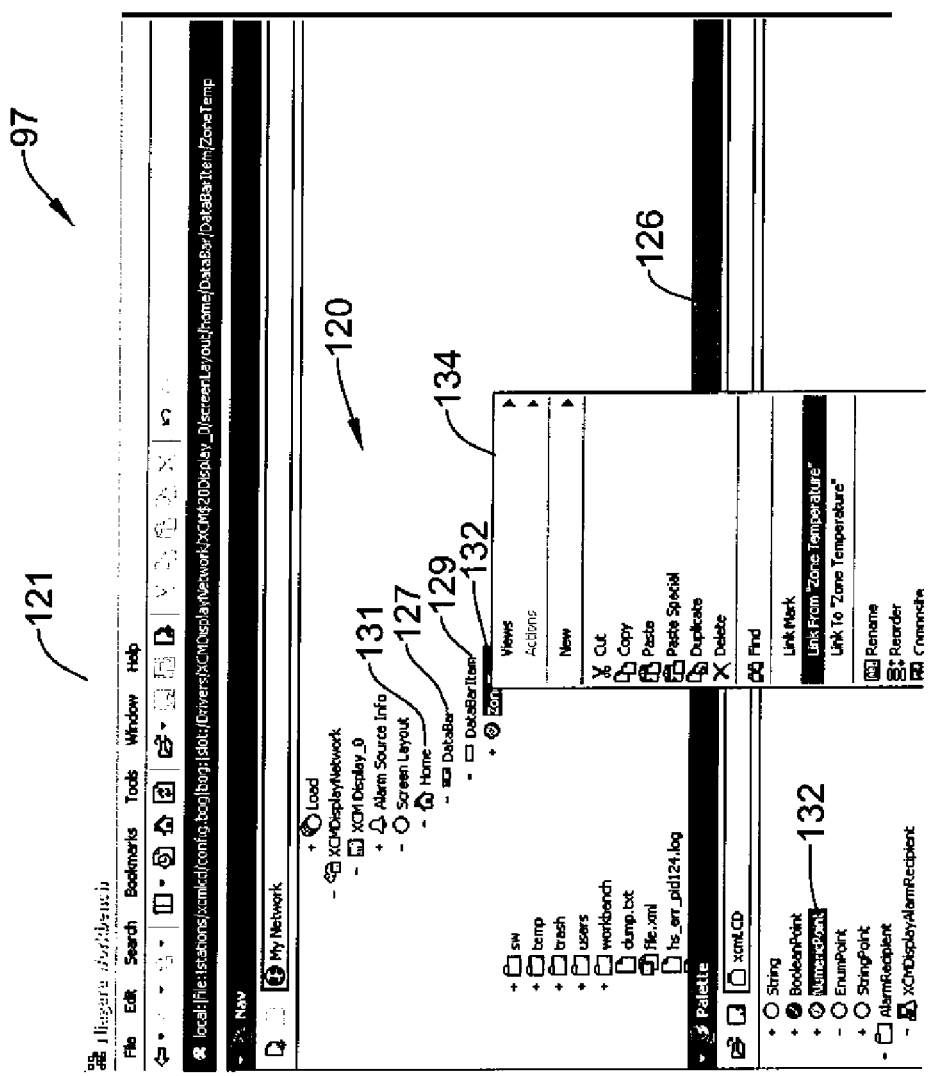
Figure 13:
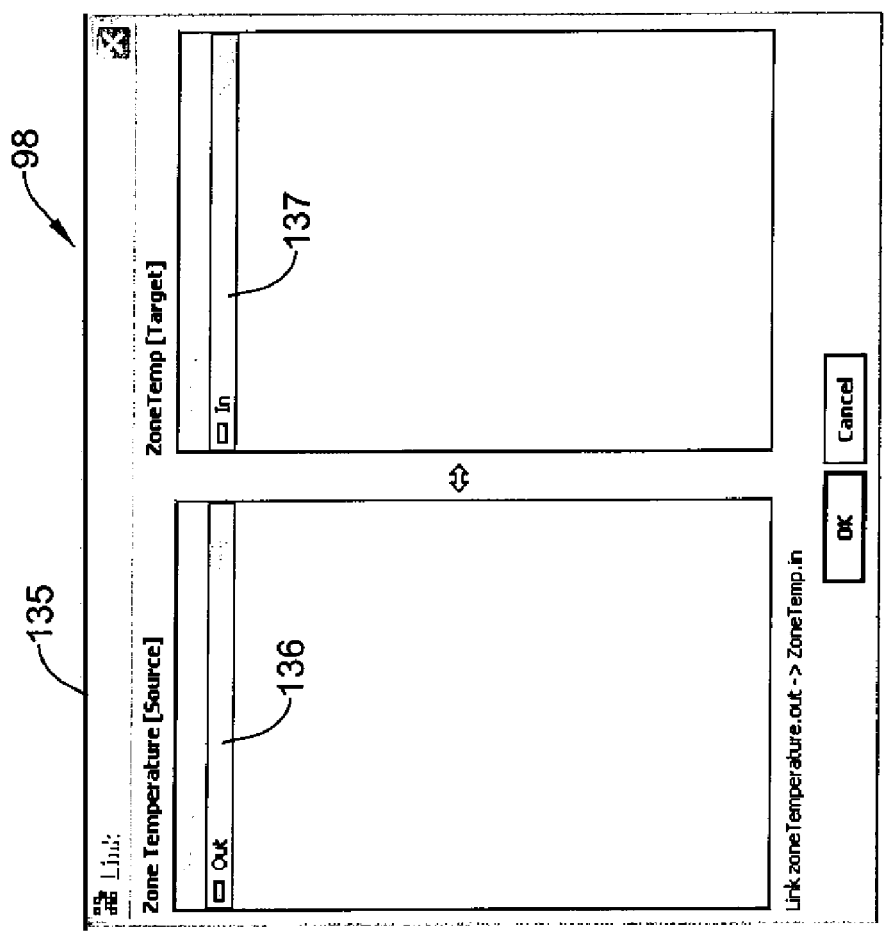

Tenth, as in block 110, to connect the two objects, one may use the right-click menu link mark option executed on the zone temperature node 133. Next, one may use the right-click menu 134 link to option executed on the ZoneTemp 132. This may display a dialog box 135 allowing selection of the specific properties to be linked. One may choose the "out" property 136 of zone temperature 133 and the "in" property 137 of ZoneTemp 132 and also the facets properties of both items. This operation allows the ZoneTemp data point 132 to share the value and facets of the source data point zone temperature 133. The three screen shots 96, 97 and 98 of FIGS. 11, 12 and 13, respectively, illustrate the operations in this step graphically.

Figure 14:
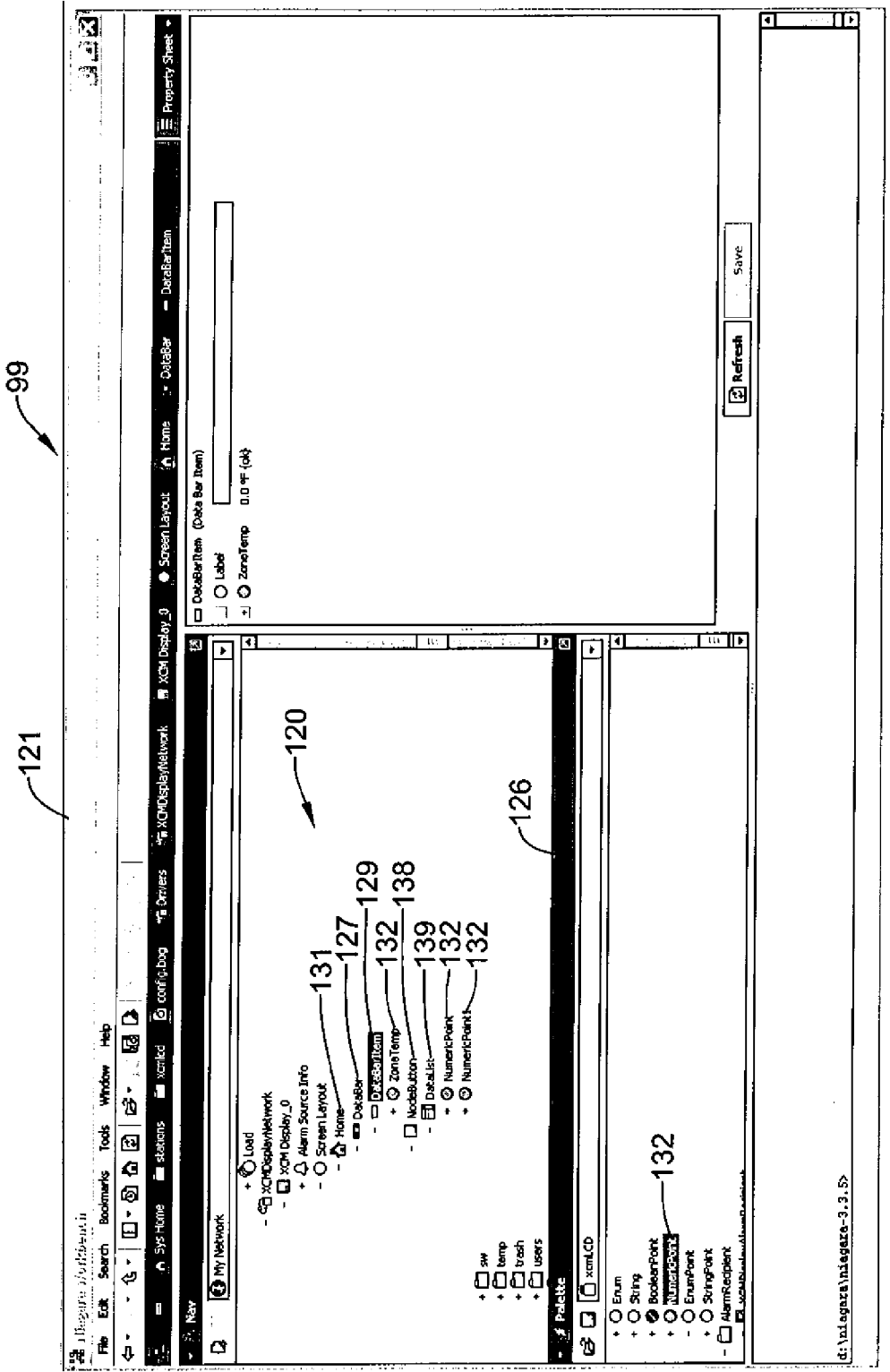

Eleventh, as in block 111, one may create a navigation button on the home screen. This button will be used to navigate to another screen containing a list of data points. To accomplish this task, first drag a NodeButton object 138 from the GeneralNavigationElements folder in the xcmLCD palette 126 onto the Home node 131. Next, drag a DataList object 139 from the Screens folder in the xcmLCD palette 126 onto the newly added NodeButton 138. This establishes a parent-child relationship between the button and the screen for later use in navigation on the embedded display. Next, drag two NumericPoint objects 132 from the palette 126 onto the newly added DataList node 139 and link-mark these data points to the desired points from the ETM-2024-0 device as in step 10 of block 110 noted herein. The resultant tree 120 is shown in the screenshot 99 of FIG. 14.

Figure 15:
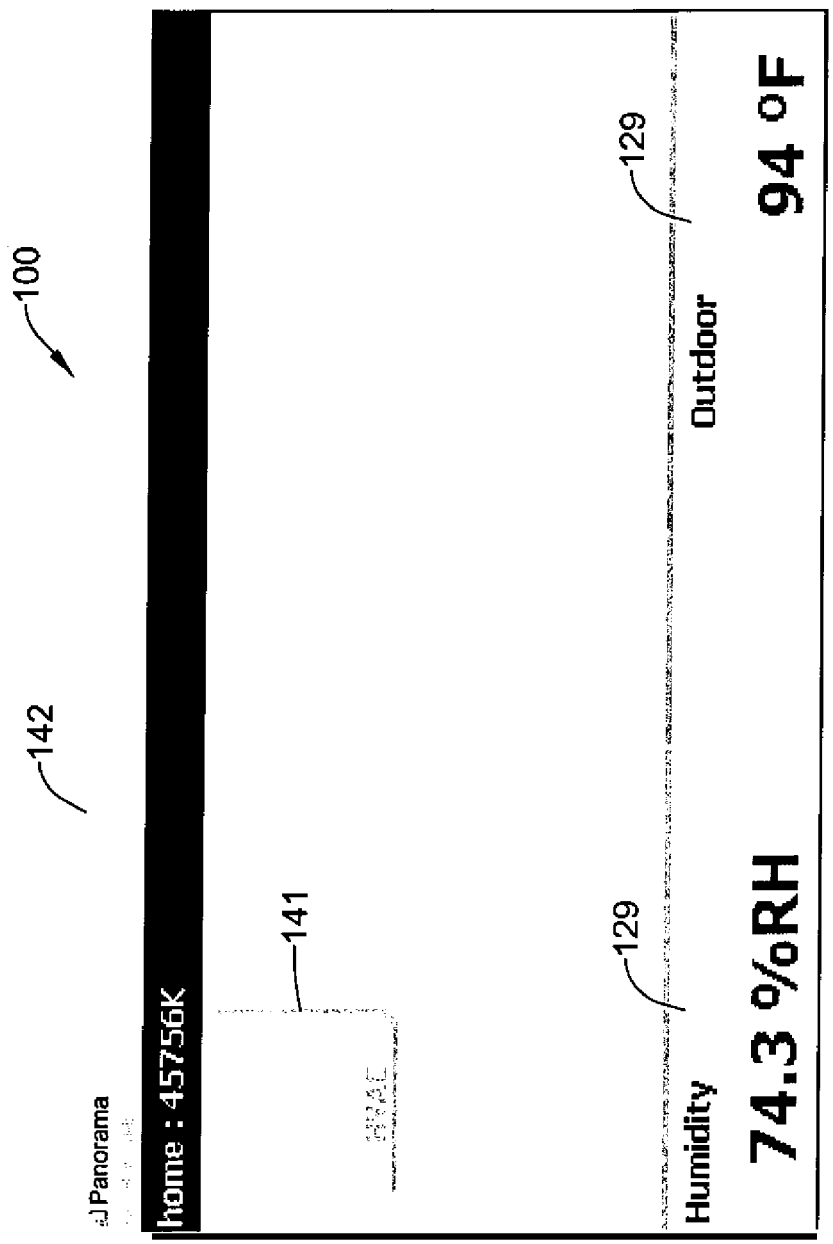
FIG. 15 is a screen shot from the embedded display device.

FIG. 15 reveals an example screen shot 100 from the embedded display device showing an example Home page 142 with one NodeButton (HVAC) a DataBar 141 and two DataBarItems 129 ("Humidity" and "Outdoor").

In summary, there may be an interface mechanism having an application control engine platform, a communications link connected to the application control engine platform, and a heterogeneous display device connected to the communications link. The communications link may have a low-level driver, and a high-level driver software component connected to the low-level driver. The application control engine platform may be Niagara-based and the heterogeneous display device may be a non-Niagara based display. The display device may be an embedded display device.

The Niagara system may have Workbench tooling, which is leveraged by the interface mechanism to generate the display device in a non-Niagara heterogeneous technology. A definition of screens and navigation for the heterogeneous display may be provided by a combination of software components added to the Niagara system and the display device.

The low-level driver may be for transferring packets over the communications link with software resident on the Niagara system and the embedded display. The high-level software component may be for reading and writing Niagara objects including, but not limited to, data points, alarms, screen definitions and navigation information to and from the low-level driver. Transfers between the display device and the Niagara system may include screen definitions, screen navigation hierarchy, live data, user-initiated data updates, alarm objects, and alarm acknowledgements.

The interface mechanism may also include a set of objects in the Niagara system. Objects of the set may be for representation of data items to be displayed on the embedded display. There may also be slots for exposing data from the objects. The slots may be building blocks for defining simple and complex data objects. The simple data objects may be wrappers for low level primitive data types. The complex data objects may provide software behavior for subscription and/or proxy across devices external to the mechanism.

The interface mechanism may also include objects provided to represent the Niagara primitive types and point-based types. The objects may be for selecting which data items are to be represented on the embedded display, and for linking source data objects of the Niagara system to destination data items on the embedded display.

The Niagara system may include a PC-based Niagara Workbench tool. The operating system, software and display rendering technology of the embedded display may have screen definition elements designed to run in the PC-based Niagara Workbench tool. The software of the embedded display may be executed by Niagara system action to provide a screen preview mode and other screens on the embedded display.

Screen definition elements, screen navigation and data item selections performed in the Niagara system may be objects persisted in a BAJA object graph (BOG) which can be encoded to an XML formatted representation referred to as a BOG snippet, and be transferred from the Niagara system via the communications driver to the embedded display. Upon receipt of the BOG snippet, the embedded display may decode XML data in the BOG snippet and populate an internal database for use of rendering screens and navigation between the screens.

The system for interfacing may have an application control engine platform rendered in a first technology, a link connected to the application control engine platform, and a display platform rendered in a second technology connected to the link. The application control engine platform may have an operating system and device drivers and resident software components. The display platform may have an operating system and device drivers, a display screen, and display resident software components.

The resident software components of the application control engine platform may have a communications driver connected to the link, a station connected to the communications driver, graphics files connected to the communications driver, and a screen layout, alarm and data point XML connected to the communications driver.

The resident software components of the display platform may have a communications driver connected to the link, graphics files connected to the communications driver, a data point updater connected to the communications driver, and a XML parser/normalizer connected to the communications driver. The first technology may be Niagara based and the second technology non-Niagara based.

There may be an approach for interfacing including providing an application control engine platform rendered in a first technology, providing a display platform rendered in a second technology, and linking the application control engine platform and the display platform. The linking of the control engine platform and the display platform may have a communications driver. The communications driver may include a low-level driver, and a high-level driver software component connected to the low-level driver.

The low-level driver may be for transferring packets over the communications link with software resident on the application control engine platform and the display platform, and the high-level software component may be for reading and writing application control engine platform objects including, but not limited to, data points, alarms, screen definitions, and navigation information to and from the low level driver. The first technology may include a Niagara based technology, and the second technology may include a non-Niagara based technology.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An interface mechanism comprising:
   a PC-based configuration tool for providing a display configuration for display devices operating using a first operating system;
   a previewer coupled to the PC based configuration tool, the previewer for previewing the provided display configuration as the display configuration would appear on a display device operating using a second operating system different than the first operating system, wherein the previewer operates using at least a subset of instructions for the second operating system;
   an application control engine platform using the first operating system, the application control engine platform including an encoder for translating configuration information received from the PC-based configuration tool into an extensible markup language (XML) document;
   a communications link connected to the application control engine platform;
   a heterogeneous display device connected to the communications link, the heterogeneous display device having the second operating system and a parser for translating an XML document into a relational database, wherein the relational database is used to generate at least one display screen; and
   wherein the interface mechanism is for a building control system.

2. The interface mechanism of claim 1, wherein the communications link comprises:
   a low-level driver; and
   a high-level driver software component connected to the low-level driver.

3. The interface mechanism of claim 2, wherein:
   the application control engine platform is Niagara-based;
   the heterogeneous display device is a non-Niagara based display; and
   the display device is an embedded display device.

4. The interface mechanism of claim 3, wherein:
   the Niagara system comprises Workbench tooling; and
   the Workbench tooling is leveraged by the interface mechanism to generate the display device in a non-Niagara heterogeneous technology.

5. The interface mechanism of claim 4, wherein a definition of screens and navigation for the heterogeneous display is provided by a combination of software components added to the Niagara system and the display device.

6. The interface mechanism of claim 4, wherein:
the low-level driver is for transferring packets over the communications link with software resident on the Niagara system and the embedded display; and
the high-level software component is for reading and writing Niagara objects including, but not limited to, data points, alarms screen definitions and navigation information to and from the low-level driver.

7. The interface mechanism of claim 6, wherein transfers between the display device and the Niagara system comprise:
screen definitions;
screen navigation hierarchy;
live data;
user-initiated data updates;
alarm objects; and
alarm acknowledgements.

8. The interface mechanism of claim 3, further comprising:
a set of objects in the Niagara system; and
wherein the objects of the set are for representation of data items to be displayed on the embedded display;
further comprising means for exposing data from the objects; and
wherein:
the means are slots;
the slots are building blocks for defining simple and complex data objects;
the simple data objects are wrappers for low level primitive data types; and
the complex data objects provide software behavior for subscription and/or proxy across devices external to the mechanism.

9. The interface mechanism of claim 8, further comprising:
objects provided to represent the Niagara primitive types and point-based types; and
wherein:
the objects are for selecting which data items are to be represented on the embedded display; and
the objects are for linking source data objects of the Niagara system to destination data items on the embedded display.

10. The interface mechanism of claim 3, wherein:
the PC-based configuration tool comprises a PC-based Niagara Workbench tool;
the subset of instructions of the second operating system, comprise screen definition elements designed to run in the PC-based Niagara Workbench tool; and
the subset of instructions of the second operating system can be executed by a Niagara system action to provide a screen preview mode and other screens on the embedded display.

11. The interface mechanism of claim 10, wherein:
screen definition elements, screen navigation and data item selections performed in the Niagara system are objects persisted in a BAJA object graph (BOG) which can be encoded to an XML formatted representation referred to as a BOG snippet and be transferred from the Niagara system via the communications driver to the embedded display; and
upon receipt of the BOG snippet, the embedded display decodes XML data in the BOG snippet and populates an internal database for use of rendering screens and navigation between the screens.

12. A system for interfacing comprising:
a configuration tool for providing a display configuration rendered in a first technology and for providing a preview of the display configuration as displayed using a second technology different than the first technology;
an application control engine platform rendered in the first technology, the application control engine platform having an interpreter for interpreting a display configuration rendered in the first technology into an XML document;
a link connected to the application control engine platform; and
a display platform rendered in the second technology, the display platform connected to the link, wherein the display platform comprises an XML parser/normalizer for translating a received XML document into a relational database used for rendering at least one display screen; and
wherein the system for interfacing is for a building control system.

13. The system of claim 12, wherein:
the application control engine platform comprises:
an operating system and device drivers; and
resident software components; and
the display platform comprises:
an operating system and device drivers;
a display screen; and
display resident software components.

14. The system of claim 13, wherein the resident software components of the application control engine platform comprise:
a communications driver connected to the link;
a station connected to the communications driver;
graphics files connected to the communications driver; and
a screen layout, alarm and data point XML connected to the communications driver.

15. The system of claim 13, wherein the resident software components of the display platform comprise:
a communications driver connected to the link;
graphics files connected to the communications driver;
a data point updater connected to the communications driver; and
wherein the XML parser/normalizer is connected to the communications driver.

16. The system of claim 13, wherein the first technology is Niagara based.

17. A method for interfacing comprising:
providing an application control engine platform rendered in a first technology;
providing a display platform rendered in a second technology; and
linking the application control engine platform and the display platform;
at the application control engine platform, translating a display configuration for use with a display rendered in the first technology to an XML document;
transferring the XML document to the display platform; and
at the display platform, parsing the transferred XML document into a relational database used for generating at least one screen on the display platform; and
wherein:
the linking of the control engine platform and the display platform comprises a communications driver; and
the interfacing is for a building control system.

18. The method of claim 17, wherein the communications driver comprises:
a low-level driver; and
a high-level driver software component connected to the low-level driver.

19. The method of claim 18, wherein:

the low-level driver is for transferring packets over the communications link with software resident on the application control engine platform and the display platform; and the high-level software component is for reading and writing application control engine platform objects including, but not limited to, data points, alarms, screen definitions, and navigation information to and from the low level driver.

20. The method of claim 19, wherein: the first technology comprises a Niagara based technology; and the second technology comprises a non-Niagara based technology.

* * * * *